US010336014B2

(12) United States Patent
Stawski

(10) Patent No.: US 10,336,014 B2
(45) Date of Patent: Jul. 2, 2019

(54) DOUBLE DIAPHRAGM VACUUM BAGGING ASSEMBLY AND METHOD OF USE

(71) Applicant: THE BOEING COMPANY, Chicago, IL (US)

(72) Inventor: Stanley Warren Stawski, Camano Island, WA (US)

(73) Assignee: THE BOEING COMPANY, Chicago, IL (US)

( * ) Notice: Subject to any disclaimer, the term of this patent is extended or adjusted under 35 U.S.C. 154(b) by 383 days.

(21) Appl. No.: 15/047,802

(22) Filed: Feb. 19, 2016

(65) Prior Publication Data

US 2017/0239896 A1    Aug. 24, 2017

(51) Int. Cl.
*B29C 70/44* (2006.01)
*B29C 33/60* (2006.01)
B29K 105/08 (2006.01)
B29C 53/04 (2006.01)
B29C 70/28 (2006.01)

(52) U.S. Cl.
CPC ............ *B29C 70/443* (2013.01); *B29C 33/60* (2013.01); *B29C 53/04* (2013.01); *B29C 70/28* (2013.01); *B29C 70/44* (2013.01); *B29K 2105/0872* (2013.01)

(58) Field of Classification Search
CPC .......... B29C 70/28; B29C 70/44; B29C 53/04
USPC ................................. 264/313, 314, 316, 322
See application file for complete search history.

(56) References Cited

U.S. PATENT DOCUMENTS

| 7,794,019 | B2 | 9/2010 | Hoberman | |
| 2010/0310818 | A1* | 12/2010 | Pridie | B29C 43/3642 428/114 |
| 2011/0127698 | A1* | 6/2011 | Alenby | B29C 70/44 264/510 |
| 2014/0116616 | A1* | 5/2014 | Kline | B29C 33/405 156/285 |

OTHER PUBLICATIONS

Screenshot of "Modulus of Elasticity of Metals" (http://www.amesweb.info/Materials/Modulus-of-Elasticity-Metals.aspx, accessed May 5, 2018) (Year: 2007).*

(Continued)

*Primary Examiner* — Joseph S Del Sole
*Assistant Examiner* — Lawrence D. Hohenbrink, Jr.
(74) *Attorney, Agent, or Firm* — Marshall, Gerstein & Borun LLP

(57) ABSTRACT

A vacuum bagging diaphragm assembly used in forming a component from composite material includes a first sheet of a first material. Also included is a second sheet of a second material for positioning between a three dimensional forming tool and the first sheet. A modulus of elasticity of the second material is greater than a modulus of elasticity of the first material. A method includes a step of positioning a composite laminate material between a first sheet of a first material and a second sheet of a second material. The second material has a modulus of elasticity greater than a modulus of elasticity of the first material. The method further includes a step of positioning the second material of the second sheet in overlying relationship to a three dimensional forming tool with the second material positioned between the three dimensional forming tool and the composite material.

16 Claims, 5 Drawing Sheets

(56) References Cited

OTHER PUBLICATIONS

"Typical Physical Properties on Mosites #1453 Silicone", Mosites Rubber Company, Inc., https://www.mositesrubber.com/wp-content/themes/mosites-theme/pdf/TDS-1453.pdf, accessed Oct. 3, 2018. (Year: 2018).*

* cited by examiner

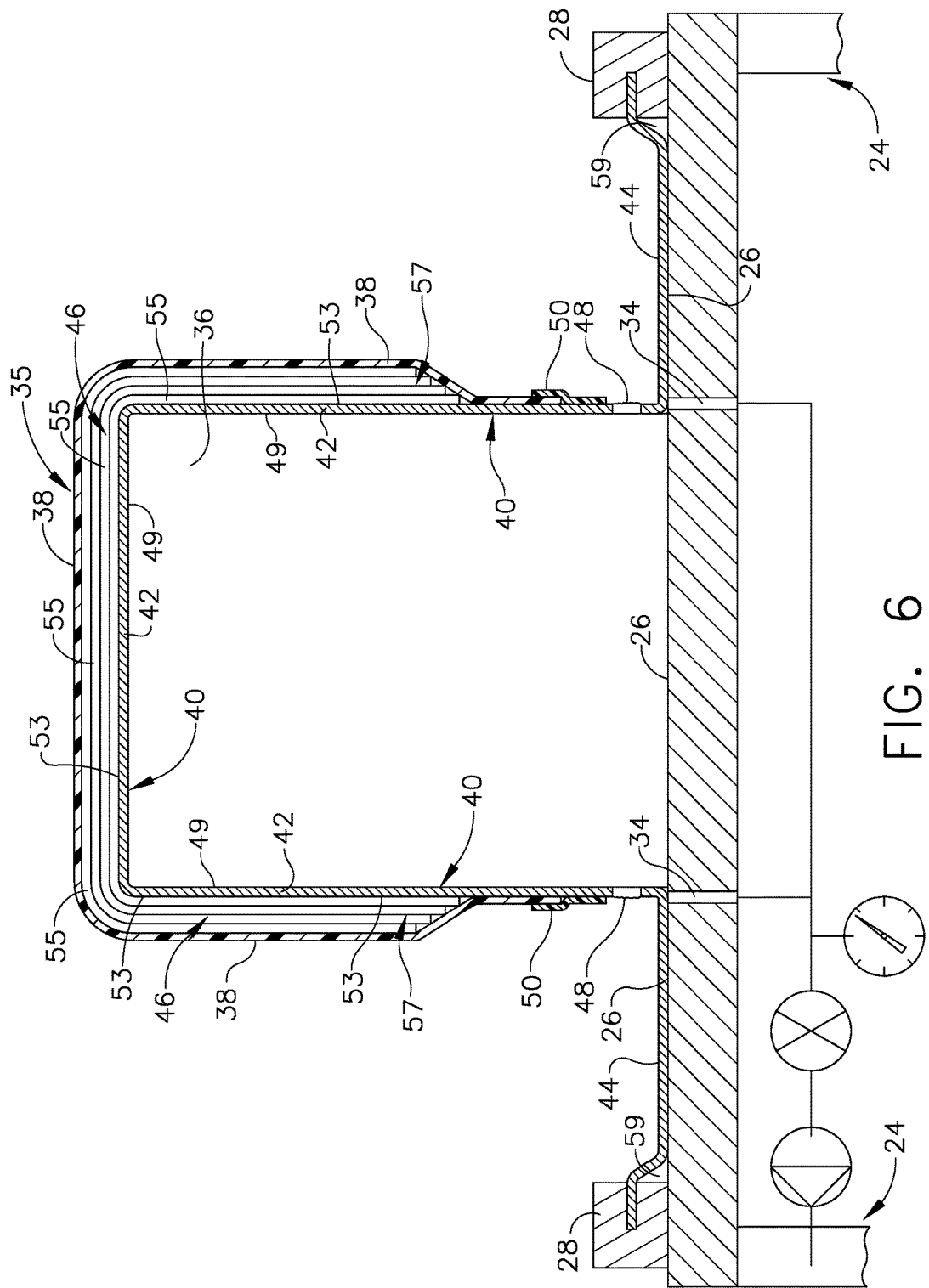

DOUBLE DIAPHRAGM VACUUM BAGGING ASSEMBLY AND METHOD OF USE

FIELD

The present invention relates to a vacuum bagging assembly used in forming composite laminate components, and more particularly, to a vacuum bagging assembly used in forming composite laminate components with a three dimensional forming tool.

BACKGROUND

In overlaying composite laminate material such as hot drape composite laminate material onto a three dimensional forming tool in fabricating three dimensional parts, it is a difficult and problematic to reduce fiber wrinkling within plies of composite laminate material. Each three dimensional part has a unique configuration such that ply winkling is often unknown until trial parts are made. As fibers in a ply extend over a contour, for example, in a three dimensional forming tool the fibers tend to wrinkle. Wrinkling of the fibers is not desired since wrinkling diminishes the strength performance of the finished composite part.

In vacuum bagging composite laminate material to form a three dimensional component configuration the use of stretchable bagging material would promote undesirable wrinkling of fibers within the composite material. The stretchable material, during the vacuum application, would apply a tension force to composite layers or plies proximate to the stretchable bagging material particularly as the plies of the composite material extended about a bend in the forming tool being used to form the three dimensional component. At the same time in contrast the elastomeric or stretchable bagging material exerts a compression force to plies or layers of the composite material more distal from the stretchable bagging material and more proximate to the forming tool. Thus, a portion of the plies are placed in tension and a portion of the plies on an opposing side of a neutral axis within the composite material are placed into compression. Those plies and fibers placed into compression promote undesirable wrinkling of the fibers thereby diminishing strength performance of the component being fabricated. As a result, there is a need to reduce or eliminate compression being exerted on fibers positioned more distal from the stretchable bagging material and more proximate to the forming tool.

SUMMARY

An example of a vacuum bagging diaphragm assembly used in forming a component from composite material, includes a first sheet which includes a first material and a second sheet which includes a second material for positioning between a three dimensional forming tool and the first sheet. A modulus of elasticity of the second material is greater than a modulus of elasticity of the first material.

An example of a method for vacuum bag molding a composite component, includes the step of positioning a composite laminate material between a first sheet which includes a first material and a second sheet which includes a second material. The second material has a modulus of elasticity greater than a modulus of elasticity of the first material. The method further includes a step of positioning the second material of the second sheet in overlying relationship to a three dimensional forming tool with the second material positioned between the three dimensional forming tool and the composite material.

The features, functions, and advantages that have been discussed can be achieved independently in various embodiments or may be combined in yet other embodiments further details of which can be seen with reference to the following description and drawings.

BRIEF SUMMARY OF THE DRAWINGS

FIG. 6 is the cross section view of FIG. 5 with the vacuum bagging diaphragm assembly in a lowered position overlying the forming tool which is positioned on support surface of the vacuum molding assembly with a partial cross section view of a portion of the vacuum molding assembly with a vacuum applied.

DESCRIPTION

Figure 1:
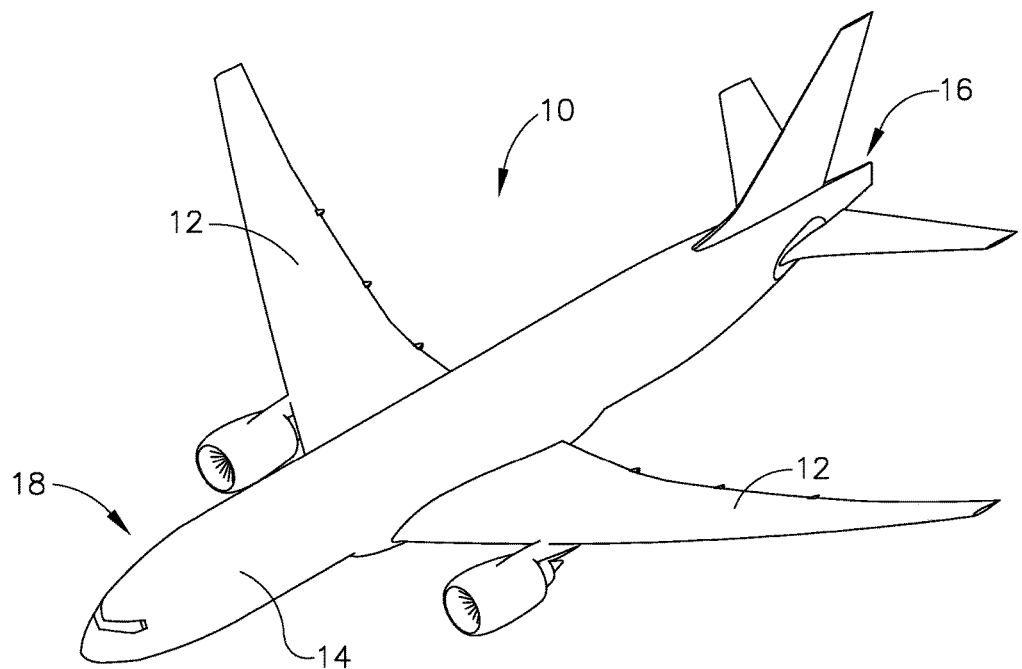
FIG. 1 is a perspective view of an aircraft.

In referring to FIG. 1, aircraft 10 includes sub-assemblies, such as wings 12, fuselage 14, tail section 16 and nose section 18 which are fabricated with composite materials. Each of these sub-assemblies require reinforcements positioned on an internal portion of aircraft 10 to provide additional strength for the sub-assembly for handling loads experienced by the sub-assembly during operation of aircraft 10. In fabrication of the reinforcement members as well as other components being manufactured for aircraft 10 with composite laminate material, it is desirable to avoid wrinkling of the fibers of the composite laminate material so as not to reduce the strength performance of the reinforcement component. With occurrence of wrinkling in fabrication, additional plies of composite may be employed in the fabrication of the reinforcement component, additional fibers may be added, as well as, employment of fabric configurations of the fibers to compensate for strength loss because of fiber wrinkling during fabrication. All of these measures will add cost and weight to the sub-assembly or other component and overall to aircraft 10. In an attempt to counter wrinkling during fabrication of the reinforcement component longer runs for a ramping of the reinforcement component may be needed which present additional design complications and ultimately additional cost.

Figure 2:
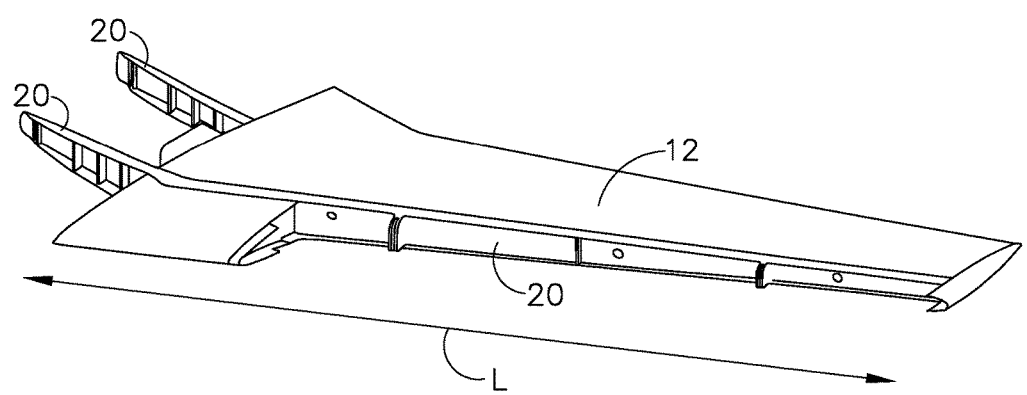
FIG. 2 is schematic cut away perspective view of a wing of the aircraft of FIG. 1.

In referring to FIG. 2, wing 12 sub-assembly is shown with reinforcement spars 20 positioned on an internal portion of wing 12 sub-assembly. Spars 20 extend outwardly from fuselage 14 and along a length L of wing 12. Spars 20 provide reinforcement and strength to wing 12 to support flight loads and weight of the wings while on the ground and to support aerodynamic loads with aircraft 10 in flight operation. With composite laminate material employed for construction of spars 20, fibers of the composite laminate material positioned to extend in a direction along length L of wing 12, need to avoid wrinkling during fabrication of spar 20 in order to optimize the strength of wing 12. A method for forming a composite component, such as for example spar 20, will be discussed below.

Figure 3:
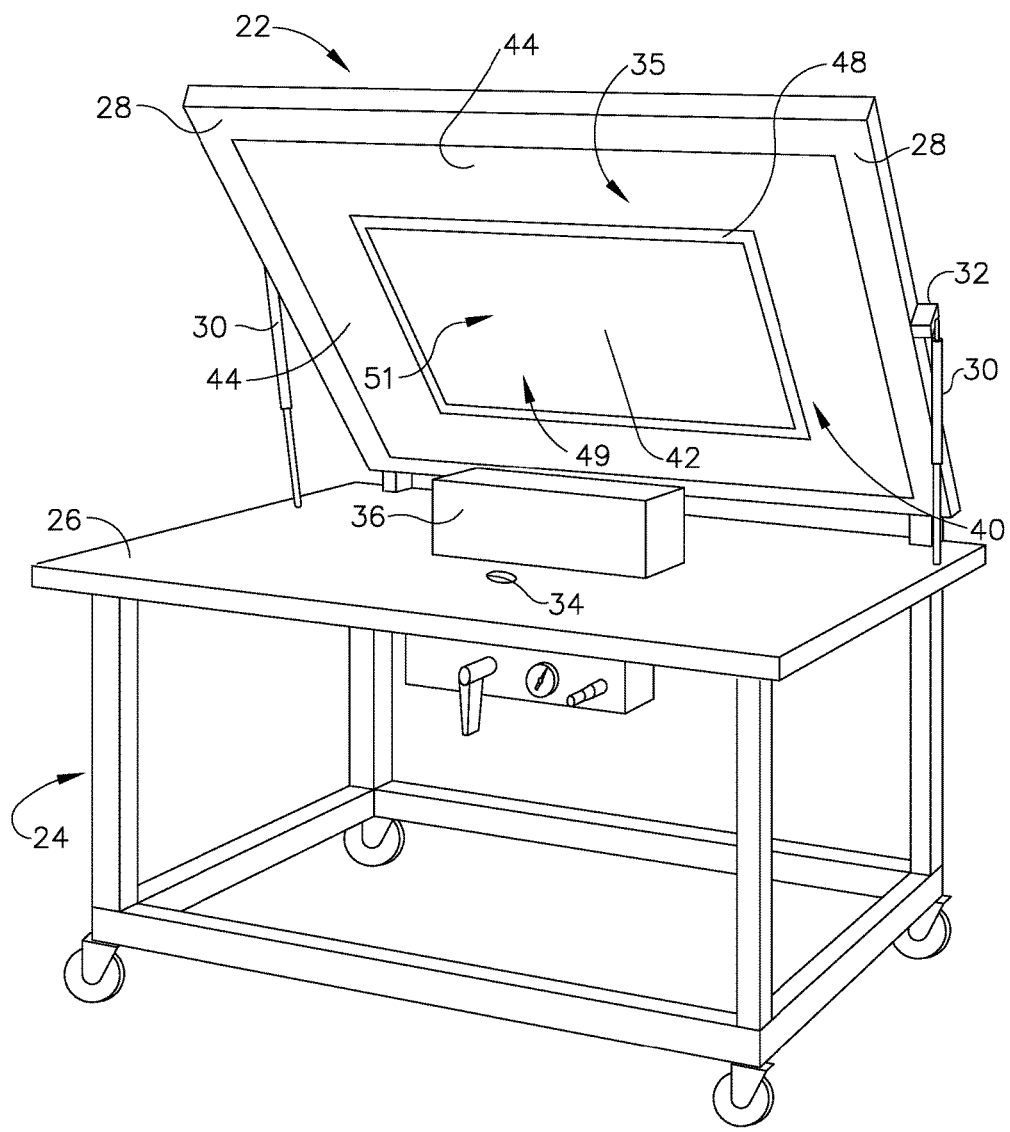
FIG. 3 is a schematic front perspective view of a vacuum bagging diaphragm assembly with a vacuum molding assembly with a forming tool positioned on the vacuum molding assembly.

In referring to FIG. 3, an example of a vacuum molding assembly 22 used for forming a component from composite material is shown. Vacuum molding assembly 22, in this example, provides a table assembly 24 with a support surface 26 positioned on an upper portion of table assembly 24. Vacuum molding assembly 22 also includes frame 28 supported by table assembly 24 wherein frame 28 is moveable, in this example, relative to surface 26. In this example, a pneumatic cylinder 30 and hinge 32 connect frame 28 to surface 26 of table assembly 24. This connection permits frame 28 to be placed and held in an upwardly extending position, as seen in FIG. 3, and permits frame 28 to be moved to a lowered position in which frame 28 is positioned onto surface 26 of table assembly 24, as seen in FIGS. 5 and 6.

Figure 4:
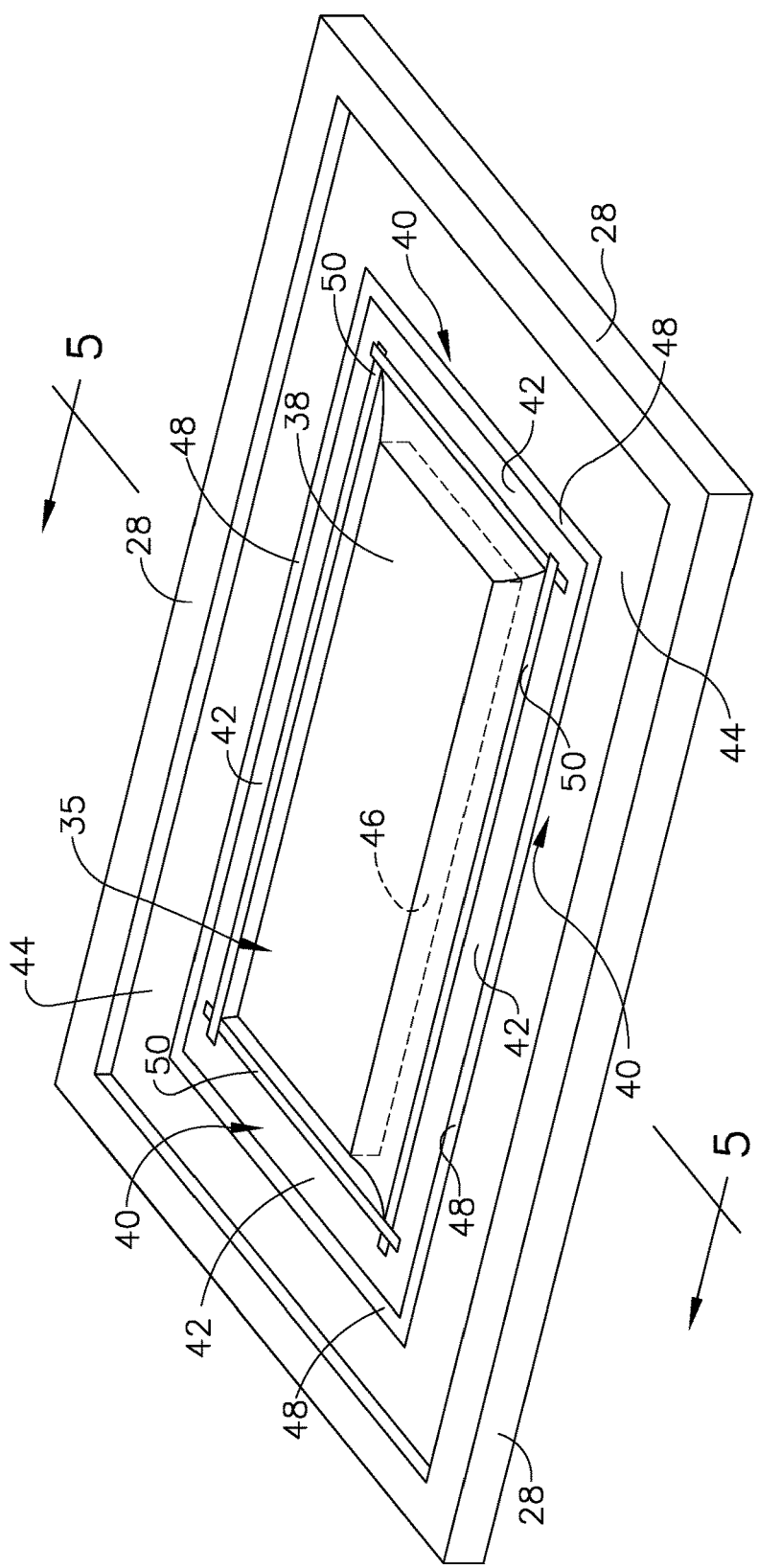
FIG. 4 is a top perspective view of the vacuum bagging diaphragm assembly of FIG. 3.
Figure 5:
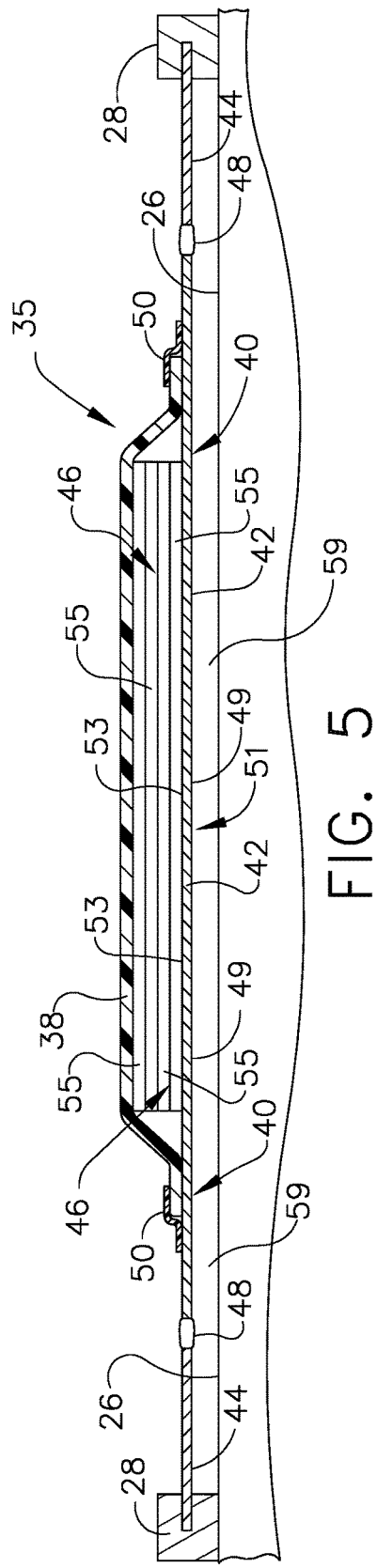
FIG. 5 is a cross section view taken along line 5-5 in FIG. 4, showing the vacuum bagging diaphragm assembly positioned in a lowered position relative to a support surface of the vacuum molding assembly without a three dimensional forming tool positioned on the support surface.

As seen in FIGS. 3-5, vacuum bagging diaphragm assembly 35 includes first sheet 38 constructed of a first material and second sheet 40, in this example, constructed of second material 42, and which will be discussed below, also constructed of third material 44. Second sheet 40 is secured to frame 28. With frame 28 in a lowered position onto surface 26 as seen in FIG. 5, without a three dimensional forming tool 36 positioned on support surface 26, an enclosure 59 is formed defined by support surface 24, frame 28 and second sheet 40, which includes second material 42 and also includes in this example third material 44. Enclosure 59 is formed with an air tight seal formed between frame 28 and surface 26 with use of an elastomeric seal (not shown) which permits an application of reduction of pressure from atmospheric pressure or otherwise a vacuum to be drawn onto enclosure 59.

In referring to FIG. 6, frame 28 is positioned in a lowered position onto surface 26 and in a sealed relationship. Three dimensional forming tool 36 is positioned within enclosure 59 on support surface 24 and second sheet 40 is in overlying relationship with three dimensional forming tool 36. A reduction of atmospheric pressure or vacuum, in FIG. 6, has been applied to enclosure 59 by way of activating a pump (not shown) and air was evacuated out of enclosure 59 through, for example, opening 34, as shown in FIGS. 3 and 6, positioned in surface 26 of table assembly 24. With the excavation of air from enclosure 59, second material of second sheet 40 of diaphragm assembly 35 is pulled downward forming second material of second sheet 40 over three dimensional forming tool 36. In this example, second material 42 of second sheet 40 is positioned to align with three dimensional forming tool 36 and forms over three dimensional forming tool 36. Third material 44 of second sheet 40, which is secured to frame 28, exerts a force on second material 42 in conjunction with the force exerted by way of the applied vacuum to enclosure 59.

As second material 42 of second sheet 40 forms over three dimensional forming tool 36, at the same time, composite laminate material 46 which has been positioned in overlying relationship to second material 42 is pulled down onto second material 42. Composite laminate material 46 is pulled down onto second material 42 by first sheet 38 of first material forming composite laminate material 46 to the configuration of second material 42 and to forming tool 36. First sheet 38 which is positioned to overlie composite laminate material 46 and at least a portion of second material 42, is secured to second material 42, as seen in FIGS. 4 and 5. First sheet 38 is secured to second material 42 of second sheet 40, in this example, with tape 50 such as vacuum sealant tape or otherwise similarly secured to second material 42 of second sheet 40. Thus, with second material 42 of second sheet 40 being pulled in a downward direction over forming tool 36 with a vacuum being applied to enclosure 59, first sheet material 38 is likewise pulled in a downward direction by second material 42 of second sheet 40 over three dimensional forming tool 36 forcing composite laminate 46 to form into a shape accommodating the shape of second material 42 and three dimensional forming tool 36.

Vacuum molding assembly 22 is used in conjunction with vacuum bag diaphragm assembly 35, in this example, to mold composite laminate material 46, such as, in this example, hot drape composite laminate material 46. The shape of the resulting component will follow the shape of the three dimensional forming tool 36 positioned on surface 26 of table assembly 24. Three dimensional forming tool 36 can be one of a variety of configurations depending on the structure needed to be formed. In this example, forming tool 36 schematically represents a form for forming spar 20 used for reinforcing wing 12. In this example, diaphragm assembly 35 is used to form composite material 46 into a shape of three dimensional forming tool 36. Forming tool 36 includes a configuration of a ruled surface, which has any portion of forming tool 36 surface following a straight line section. For example, among many shapes this could include, this would include a cylinder shape. Additionally, among many shapes forming tool 36 could take on, this would alternatively include forming tool 36 having surface which would include a series or plurality of planar facet surfaces forming three dimensional forming tool 36. This three dimensional forming tool 36 surface would be able to be laid out in a two dimensional pattern without distortion such that composite laminate material could be placed on the three dimensional forming tool 36 surface without requiring darts in the material to conform to the surface and without incurring tension or compression being imparted to the composite material by the surface.

The composite material 46 or in this example hot drape composite laminate material 46 is placed in forming relationship with three dimensional forming tool 36, as discussed above, in overlying relationship with second material 42 of second sheet 40. A vacuum is drawn with frame 28 positioned forming an air tight seal with surface 26, resulting in composite material 46 forming into a shape of second material 42 and three dimensional forming tool 36.

Vacuum bagging diaphragm assembly 35 can be seen in FIGS. 3-5. In referring to FIGS. 4 and 5 first sheet 38 constructed of a first material 38 of diaphragm assembly 35 is constructed of an elastic material which permits stretching of the material with a force applied to first sheet 38. In this example, with first sheet 38 secured to second material 42 of second sheet 40, a tension force will be applied to first sheet 38 from second material 42 with a vacuum applied to enclosure 59. First sheet 38 will pull down onto composite laminate material 46. First material of first sheet 38 includes being constructed of one of a number of materials such as latex and silicon. In this example, first sheet 38 is constructed to have a thickness in a range including one thousandth of an inch (0.001 inch) to and including five hundredths of an inch (0.050 inch).

Vacuum bagging diaphragm assembly 35 further includes second sheet 40 which includes second material 42 and, in this example, a portion of second sheet 40 is also constructed of a third material 44. As can be seen in FIG. 6, second sheet 40 is positioned between three dimensional forming tool 36 and first sheet 38. Second material 42 of second sheet 40 is constructed of a material which includes one of a sheet of metal and a sheet of fiber reinforced elastomeric material and other such materials that are more difficult to stretch than that of first sheet 38 constructed of first material. Second material 42 of second sheet 40 has a modulus of elasticity greater than a modulus of elasticity for first material of first sheet 38. Second material 42 is positioned to be placed in overlying relationship with three dimensional forming tool 36 with frame 28 moved to a lowered position with respect to surface 26, as discussed above.

As mentioned above, second material 42 has a greater modulus of elasticity than that of first material of first sheet 38. For example, first sheet 38 with first material, in this example, is constructed of a latex material which has much more stretching capability for a given force applied than for example second material 42 which, in this example, is a metal sheet such as aluminum having a thickness of ten to twenty ten thousandths of an inch (0.010 to 0.020 inches). This difference in the modulus of elasticity contributes to providing a neutral axis being positioned proximate to second material 42 of the second sheet 40 in the vacuum forming process. With a vacuum applied to enclosure 59, first sheet 38 constructed of first material is pulled down onto composite laminate material 46 along with second material 42 of second sheet 40 being pulled down onto three dimensional forming tool 36, wherein second material 42 and composite laminate material 46 form into the configuration of three dimensional forming tool 36. First sheet 38 is pulled in tension by second material 42 and third material 44 of second sheet 40, in this example, as vacuum is drawn in enclosure 59. This tension force in first sheet 38 is transferred into upper layers or plies 55 of composite laminate material 46, as seen in FIG. 6. The tension force is transmitted through plies 55 to the plies positioned further away from first sheet 38. Because the modulus of elasticity of second material 42 is greater than the modulus of elasticity of first sheet 38, a neutral axis with respect to forces located within plies 55 is positioned proximate to second material 42 of second sheet 40. This positioning of the neutral axis reduces, if not eliminates, the transmission or exertion of a compression force onto any plies 55 of composite laminate material 46. Such reduction or elimination of compression force onto plies 55 of composite laminate material 46 results in the reduction, if not the elimination of wrinkling of plies 55 and corresponding fibers being incurred by composite laminate material 46 in the vacuum forming process.

Vacuum bagging diaphragm assembly 35 as mentioned above includes second sheet 40 which includes second material 42, as described above, and in this example, includes third material 44, which is constructed of one of latex and silicon and the like. The modulus of elasticity of second material 42 of second sheet 40 is greater than a modulus of elasticity of third material of second sheet 40. Thus, for a given force imparted to third material 44, third material 44 will more easily stretch than second material 42. Third material 44 is secured to frame 28, as seen in FIGS. 4-6. Third material 44 is bonded to second material 42 at bond 48 positioned, in this example, about a perimeter of second material 42 of second sheet 40. With lowering of frame 28 onto support surface 24 and the application of a vacuum to enclosure 59, second material 42 forms over three dimensional forming tool 36 and third material 44 secures second material 42 to frame 28.

In operation of vacuum bagging diaphragm assembly 35 in conjunction with vacuum molding assembly 22, in this example, frame 28 is lowered down over three dimensional forming tool 36 positioned on and providing support to three dimensional forming tool 36 and onto support surface 26 with first side 49 of second material 42 of second sheet 40 positioned so as to come into contact with three dimensional forming tool 36. In this example, second material 42 of second sheet 40 is positioned in a central portion 51 of second sheet 40 and third material 44 of second sheet 40 is secured to and positioned about a perimeter, as mentioned above, of second material 42 of second sheet 40. As also mentioned above, third material 44 of second sheet 40, in turn, is secured to the frame 28, as seen in FIGS. 3 and 5.

Prior to lowering of frame 28 onto surface 26, a releasing agent is applied onto or otherwise positioned onto second side 53 of second material 42. A releasing agent such as employed for composite mold release is applied. Composite material 46 is positioned to overlie the releasing agent and second side 53 of second material 42 of second sheet 40. Releasing agent is used so as to assist in removal of composite laminate material 46 from second side 53 of second material 42 of second sheet 40 after the forming process has been completed.

Composite laminate material 46 can be constructed of a wide range of materials. As mentioned above, hot drape laminate material is used in this example. This hot drape material includes heating pre-preg composite laminate material. Such heating of the pre-preg in this example would include room temperature such as seventy degrees Fahrenheit (70° F.) up to and include the temperature of two hundred degrees Fahrenheit (200° F.). Composite laminate material 46 can be heated for a time period up to and including one hour as needed by the resin to permit slipping between plies 55 of composite laminate material 46. The heating of the resin within composite laminate material 46 will permit the resin to reduce its shear resistance. As a result, with the forming of the hot draping of composite laminate material 46 being positioned on second material 42 of second sheet 40 and a vacuum is applied which causes bending of second material 42 by forming tool 36, the individual plies 55, as seen in FIG. 6, can move relative to one another creating a leafing of edges or step-like arrangement 57 of plies 55. The ability of adjacent plies 55 to move relative to one another will also help avoid distortion of the plies 55 and fibers associated with plies 55. Other pre-preg materials which have a less viscous resin at around room temperature, for example, could be employed such that their resin will permit plies to slip relative to one another being positioned on second material 42 of second sheet 40 and being formed by forming tool 36 with application of a vacuum or reduction in pressure in enclosure 59. In use of such pre-preg materials additional heating above room temperature would not be needed. In the instance of a resin transfer molding process, dry fiber can be placed on second material 42 of second sheet 40 and resin introduced with heating applied during the forming process.

Other composite laminate materials other than pre-preg material can also be used such as separately introduced dry fiber and resin. A wide variety of laminate materials can be employed constructed of select resin and fiber materials. Composite laminate material 46, in this example, includes a plurality of plies containing fibers. The fibers are constructed from one of a number of fiber materials such as carbon, fiberglass and aramid. The fibers are configured in one of a number of configurations including a fabric that is woven or knitted, a tape and unidirectional fibers and the like. Plies of the composite material 46 can be selectively oriented such that fibers within successive plies may extend in different desired angular directions relative to one another to provide a particular desired strength in the component being fabricated. Resins are selected from one of thermoset and thermoplastic resins. A number of plies will be employed to obtain the desired strength for the particular component being fabricated.

As mentioned above, with composite material 46 positioned overlying second material 42 of second sheet 40, in this example, with a vacuum or reduced pressure applied to enclosure 59, the individual successive plies 55 of composite material 46 are permitted to slide relative to one another forming step-like leafing of end portions 57 of composite material 46. First sheet 38 is positioned to overlie composite laminate material 46, as seen in FIGS. 4-6, and as seen in FIG. 5, first sheet 38 also overlies at least a portion of second material 42 of the second sheet 40. First sheet 38 is secured to second material 42 of second sheet 40 with tape 50 such as vacuum sealant tape or otherwise secured. With frame 28 lowered onto surface 26, frame 28 is secured and sealed to surface 26 creating an airtight seal with surface 26. In this example, (not shown) a low durometer elastomeric seal is positioned about a perimeter of surface 26 and frame 28 wherein the seals are aligned with one another. With frame 28 and surface 26 clamped together with clamps (not shown) an air tight seal is formed. A reduced pressure or vacuum is applied to enclosure 59 formed with surface 26, frame 28 and second sheet 40 of diaphragm assembly 35. In this example, the hot drape composite laminate material 46 positioned on second material 42 of second sheet 40 goes from a neutral state, as seen in FIG. 5, and bends along with second material 42 over three dimensional forming tool 36, as seen in FIG. 6, with the application of the reduce pressure or vacuum. Plies 55 proximate to first sheet 38 are placed in tension. Plies 55 more proximate to second material 42 experience less tension placing a near neutral axis along second surface 53 of second material 42 of second sheet 40. With a neutral axis positioned proximate to second surface 53 of second material 42, exertion of compression forces to plies 55 is avoided thereby avoiding undesired wrinkling of plies 55 and fibers associated with those plies.

A method for vacuum bag molding a composite component includes positioning composite laminate material 46 between first sheet 38 made of a first material and second sheet 40. As described above, second sheet 40 includes second material 42 and, in this example, includes a portion constructed of a third material 44. Second material 42 of second sheet 40 has a modulus of elasticity greater than a modulus of elasticity of first material of first sheet 38. The method further includes positioning second material 42 of second sheet 40 in overlying relationship to three dimensional forming tool 36. Second material 42 is positioned between three dimensional forming tool 36 and composite material 46.

The method further includes a step of applying a releasing agent, as mentioned above, onto second side 53 of second material 42 of second sheet 40 prior to performing the step of positioning composite material 46 onto second material 42 such that the releasing agent contacts composite laminate material 46.

As discussed earlier, second material 42 of second sheet 40 is positioned in a central portion 51 of second sheet 40 and a third material 44 of second sheet 40 is secured to second material 42 and positioned about a perimeter of second material 42. This method further includes a step of securing first sheet 38, as earlier discussed, to second material 42 of second sheet 40.

Third material 44, in this example, is secured to frame 28 associated with support surface 26. Support surface 26 provides support for three dimensional forming tool 36, as earlier discussed. The step of positioning second material 42 further includes a step of lowering frame 28 relative to support surface 26 with second material 42 of second sheet 40 in contact with three dimensional forming tool 36. The method further includes a step of forming an air tight seal, as previously discussed, between frame 28 and support surface 26, as well as, forming an enclosure 59 by way of support surface 26, frame 28 and second and third materials 42, 44 of second sheet 40.

The method includes a step of applying a reduced pressure from atmospheric pressure within enclosure 59. With second material 42 of second sheet 40 formed to three dimensional forming tool 36, the method further includes a step of discontinuing applying reduced pressure from atmospheric pressure within enclosure 59 and includes a step of releasing frame 28 from support surface 26.

While various embodiments have been described above, this disclosure is not intended to be limited thereto. Variations can be made to the disclosed embodiments that are still within the scope of the appended claims.

What is claimed:

1. A method for vacuum bag molding a composite component in a vacuum bagging diaphragm assembly, comprising the steps of:
    positioning a composite laminate material between a first sheet comprising a first material and a second sheet comprising a second material wherein the second material has a modulus of elasticity greater than a modulus of elasticity of the first material;
    positioning the second material of the second sheet in overlying relationship to a three dimensional forming tool with the second material positioned between the three dimensional forming tool and the composite laminate material, wherein:
        the second sheet further comprises a portion of the second sheet constructed of a third material;
        the modulus of elasticity of the second material is greater than a modulus of elasticity of the third material;
        the second material of the second sheet is positioned in a central portion of the second sheet;
        the third material of the second sheet is secured to and positioned about a perimeter of the second material of the second sheet and is secured to a frame; and
    lowering the frame toward a support surface, wherein:
        the support surface is associated with the frame and the support surface provides support for the three dimensional forming tool; and
        a first side of the second material of the second sheet is positioned in contact with the three dimensional forming tool.

2. The method for vacuum bag molding a composite component of claim 1, further includes a step of applying a releasing agent onto the second side of the second material of the second sheet prior to the step of positioning the composite laminate material.

3. The method for vacuum bag molding a composite component of claim 1, further includes a step of securing the first sheet to the second material of the second sheet.

4. The method for vacuum bag molding a composite component of claim 1, further including a step of forming an air tight seal between the frame and the support surface and forming an enclosure comprising of the support surface, the frame and the second and third materials of the second sheet.

5. The method for vacuum bag molding a composite component of claim 4, further including a step of applying a reduced pressure from atmospheric pressure within the enclosure.

6. The method for vacuum bag molding a composite component of claim 5, with the second material of the second sheet formed to the three dimensional forming tool, further including a step of discontinuing applying the reduced pressure from atmospheric pressure within the enclosure and including a step of releasing the frame from the support surface.

7. A vacuum bagging diaphragm assembly used in forming a component from composite material, wherein the vacuum bagging diaphragm assembly, comprises:
   a first sheet comprising a first material; and
   a second sheet comprising a second material for positioning between a three dimensional forming tool and the first sheet, wherein:
      a modulus of elasticity of the second material is greater than a modulus of elasticity of the first material;
      the second sheet further comprises a portion of the second sheet constructed of a third material;
      the modulus of elasticity of the second material is greater than a modulus of elasticity of the third material;
      the second material of the second sheet is positioned in a central portion of the second sheet;
      the third material of the second sheet is secured to and positioned about a perimeter of the second material of the second sheet and is secured to a frame; and
      the first and second sheets include a composite laminate material positioned between the first and second sheets and
   a support surface, which provides support for the three dimensional forming tool, and is associated with the frame, wherein a first side of the second material of the second sheet is positioned to contact the three dimensional forming tool with lowering the frame toward the support surface.

8. The vacuum bagging diaphragm assembly of claim 7, wherein the first material of the first sheet is constructed of one of latex and silicon.

9. The vacuum bagging diaphragm assembly of claim 7, wherein the second material of the second sheet comprises one of a metal sheet and fiber reinforced elastomeric material.

10. The vacuum bagging diaphragm assembly of claim 7, wherein the third material of the second sheet comprises one of latex and silicon.

11. The vacuum bagging diaphragm assembly of claim 7, further including the third material of the second sheet is secured to a frame.

12. The vacuum bagging diaphragm assembly of claim 7, wherein a second side of the second material of the second sheet has a releasing agent positioned on the second side of the second material of the second sheet.

13. The vacuum bagging diaphragm assembly of claim 12, wherein the composite laminate material is positioned overlying the releasing agent positioned on the second side of the second material of the second sheet.

14. The vacuum bagging diaphragm assembly of claim 13, further includes the first material of the first sheet positioned overlying the composite laminate material and at least a portion of the second material of the second sheet.

15. The vacuum bagging diaphragm assembly of claim 14, wherein the first sheet is secured to the second material of the second sheet.

16. A vacuum bagging diaphragm assembly used in forming a component from composite material, wherein the vacuum bagging diaphragm assembly, comprises:
   a first sheet comprising a first material; and
   a second sheet comprising a second material for positioning between a three dimensional forming tool and the first sheet, wherein:
      a modulus of elasticity of the second material is greater than a modulus of elasticity of the first material;
      the second sheet further comprises a portion of the second sheet constructed of a third material;
      the modulus of elasticity of the second material is greater than a modulus of elasticity of the third material;
      the second material of the second sheet is positioned in a central portion of the second sheet; and
      the third material of the second sheet is secured to and positioned about a perimeter of the second material of the second sheet and is secured to a frame; and
   a support surface, which provides support for the three dimensional forming tool, and is associated with the frame; wherein a first side of the second material of the second sheet is positioned in contact with the three dimensional forming tool with lowering the frame toward the support surface.

* * * * *